United States Patent [19]

Linehan

[11] 4,234,608
[45] Nov. 18, 1980

[54] PROCESS OF MANUFACTURING FEED BLOCKS AND PRODUCTS THEREOF

[75] Inventor: Kevin L. Linehan, East Burwood, Australia

[73] Assignee: ICI Australia Limited, Melbourne, Australia

[21] Appl. No.: 951,954

[22] Filed: Oct. 16, 1978

[30] Foreign Application Priority Data

Nov. 1, 1977 [AU] Australia ............................. 2259/77

[51] Int. Cl.³ ..................... A23K 1/16; A23K 1/175; A23K 1/20
[52] U.S. Cl. ...................................... 426/72; 426/74; 426/623; 426/630; 426/635; 426/658; 426/512; 426/807
[58] Field of Search ................. 426/72, 635, 623, 807, 426/630, 512, 658, 74

[56] References Cited

U.S. PATENT DOCUMENTS

| | | | |
|---|---|---|---|
| 1,867,063 | 7/1932 | Dawe | 426/623 |
| 2,162,609 | 6/1939 | Dawe | 426/635 X |
| 2,170,713 | 8/1939 | Stadl | 426/635 |
| 2,707,151 | 4/1955 | Martin | 426/635 |
| 3,420,672 | 1/1969 | Appleman | 426/635 X |
| 3,443,956 | 5/1969 | Muller et al. | 426/623 X |
| 3,532,503 | 10/1970 | Kviesitis | 426/807 |
| 3,573,924 | 4/1971 | Zarow | 426/635 X |
| 3,982,027 | 9/1976 | Valeur et al. | 426/635 X |
| 3,983,255 | 9/1976 | Bass | 426/635 X |
| 4,027,043 | 5/1977 | Schroeder et al. | 426/807 |
| 4,160,041 | 7/1979 | Schroeder et al. | 426/807 |
| 4,171,385 | 10/1979 | Skoch et al. | 426/807 |
| 4,171,386 | 10/1979 | Skoch et al. | 426/807 |

Primary Examiner—William F. Smith
Attorney, Agent, or Firm—Cushman, Darby & Cushman

[57] ABSTRACT

A process for the preparation of animal feed supplement blocks by chemically hardening a nutrient containing water bearing medium using active magnesium oxide and dicalcium phosphate.

25 Claims, No Drawings

PROCESS OF MANUFACTURING FEED BLOCKS AND PRODUCTS THEREOF

This invention relates to the manufacture of animal feed blocks having medicinal and/or nutritional value. In particular the invention relates to a process for the manufacture of a substantially rigid animal feed block by hardening a water bearing medium comprising medicaments and/or nutrients using magnesium oxide and dicalcium phosphate.

By the term "substantially rigid block" we mean a block which does not undergo any appreciable plastic flow under its own weight and which retains its shape over long periods of time in the field under rural conditions.

In our Australian Pat. No. 471,601 we teach a method for the preparation of a grass tetany therapeutic block utilising a chemical hardening process employing the reaction between magnesium oxide and molasses.

We have now found an improved process for the manufacture of chemically hardened feed blocks which utilises both magnesium oxide and dicalcium phosphate as hardening agents. The novel process has many advantages over our previous process including: a significant reduction in the time required to manufacture the feed blocks; the preparation of a wide range of feed blocks from water bearing media other than molasses; and the production, when required, of more palatable blocks with a lower magnesium content.

Accordingly we provide a process for the manufacture of a substantially rigid animal feed supplement block which process comprises the following steps in sequence:

(1) heating a water bearing medium as hereinafter defined to a temperature in the range from 20° C. to 90° C.;

(2) adding to said water bearing medium an amount of active magnesium oxide in the range from 5% to 30% by weight of the total block ingredients and an amount of dicalcium phosphate in the range from 3 to 50% by weight of the total block ingredients and blending the mixture of the water bearing medium, magnesium oxide and dicalcium phosphate at a temperature not in excess of 90° C. for a sufficient length of time to obtain a substantially uniform reaction mixture;

(3) optionally blending into the mixture additional water or one or more liquid or solid animal medicaments or animal nutrients;

(4) transferring said reaction mixture to a mould; and (5) maintaining the temperature of the reaction mixture in the mould in the range from 45° C. to 110° C. until said reaction mixture becomes rigid.

By "water bearing medium" we mean water or water containing dissolved, dispersed or suspended animal medicaments and/or animal nutrients or a flowable, pourable or pumpable medium comprising animal medicaments and/or animal nutrients and water. Preferably the water bearing medium comprises an amount of water equivalent to 3 to 55% (more preferably 6–50%) by weight of the total block ingredients. The total amount of water used in the preparation of the blocks ie the amount of water contained in the water bearing medium and the amount optionally blended into the reaction mixture in step (3) of the process of the invention, is preferably in the range from 6 to 55% (more preferably 10 to 50%) by weight of the total block ingredients.

Suitable water bearing media include water, aqueous whey, aqueous sorbitol, aqueous glucose, aqueous fructose, aqueous sucrose and molasses each optionally containing dissolved, dispersed or suspended animal medicaments and/or animal nutrients.

Suitable animal medicaments include, vitamins, trace elements, additional sources of magnesium, additional sources of phosphate, additional sources of calcium, sources of sodium, sources of sulphur and medicaments for treating animal diseases or killing or repelling animal pests.

Sources of vitamins, trace elements, sodium and sulphur and additional sources of magnesium, phosphate and calcium may be incorporated into the feed blocks manufactured by the process of the invention where there is a deficiency of these materials in the available feed or where the animal's state of health would benefit from the ingestion of such therapeutic materials. Animal medicaments suitable for the treatment or prevention of animal diseases or to kill or repel animal pests also may be incorporated into the feed blocks manufactured by the process of the invention where such medicaments are required.

Vitamins which may be incorporated into the feed blocks include Vitamin A, preferably in the stabilized acetate form, and Vitamin C. Preferably vitamins are added to the reaction mixture as a slurry with a small amount of water towards the end of the blending operation.

Trace elements which may be incorporated into the feed blocks include trace minerals such as iron, cobalt, copper, zinc and manganese which are preferably added in the form of the sulphate salts.

Iodine as stabilized potassium iodide or ethylene diamine dihydroiodate may also be incorporated into the feed blocks. Preferably trace elements are added to the reaction mixture towards the end of the blending operation.

Other animal medicaments which may be incorporated into the animal feed blocks manufactured by the process of the invention include: suitable anthelmintic preparations useful in the prevention or treatment of infestation of animals by parasites including, for example, gastrointestinal parasites, liver fluke and lungworm; suitable preparations which act systemically to kill or repel pests including insect pests such as nuisance flies and endoparasites such as ixodes; suitable growth promoting agents; and other animal medicaments suitable for oral administration.

Suitable animal nutrients include tallow, protein and/or carbohydrate sources such as the feed meals including barley meal, blood meal, dried buttermilk, cotton seed meal, linseed meal, meat and bone meal, wheat middlings, soya bean meal, dried whey, peanut meal, rice meal and sunflower meal, carbohydrate sources such as maize germ, roughage, crushed grain, millet seed, molasses cane, wheat dust, sucrose, glucose, fructose and sorbitol and non-protein nitrogen sources such as urea, biuretm methylene diurea, urea phosphate, urea sulphate, crotonylidene diurea and isobutylidene diurea.

By "active magnesium oxide" we mean magnesium oxide of a sufficiently reactive grade such that it reacts substantially completely with the water bearing medium according to the process of the invention within a reasonable length of time; say less than six hours.

Whilst pure magnesium oxide may be used as "active magnesium oxide" the cost of such material is comparatively high. The small amounts of impurities which are normally found in commercially available grades of active magnesium oxide can be tolerated in the feed blocks prepared by the process of our invention and therefore commercially available grades of magnesium oxide are suitable for use in the process of the invention.

Typical of such commercial grades of magnesium oxide suitable for use in the process of the invention are those known as caustic-burned magnesias produced by calcining magnesite, dolomite or magnesium hydroxide at temperatures less than 900° C. Particularly suitable magnesium oxides are "Causmag" grades XLF, AL3 and AL$_4$ ("Causmag" is a trade name of a proprietary brand of magnesium oxide available from Causmag Ore Co Pty Ltd of Young NSW Australia); standard magnesite MgO types 369, 469 and 569 from Martin Marietta Chemicals, Hunt Valley, Marylands, USA; and "Magox" types 95, 90 and Feed Grade ("Magox" is a trade name of Basic Incorporated, Cleveland, Ohio, USA). The more active grades of magnesium oxide have a low bulk density but high specific gravity and are obtained by relatively low temperature (around 400° C.) calcination of magnesium hydroxide or magnesium carbonate. Preferably the active magnesium oxide used in step 2 of the process of the invention is in finely divided form to facilitate the hardening process.

Calcium oxide may be used in place of some of the active magnesium oxide used in block preparation. However, in general the use of calcium oxide is not preferred because of the difficulty in controlling the reaction temperature and the inferior physical properties of the blocks produced.

The nature of the dicalcium phosphate, also known as dicalcium orthophosphate, used in step 2 of the process of the invention is not narrowly critical. Commercially available grades of dicalcium phosphate are suitable, however, preferably finely divided, defluorinated dicalcium phosphate is used.

The temperature to which the water bearing medium is heated in step 1 of the process of the invention is not narrowly critical. For the production of most types of feed blocks temperatures above 40° C. and preferably from 55° to 80° C. are suitable.

The time required to blend and initially react the water bearing medium, active magnesium oxide and dicalcium phosphate will depend to some extent on the temperature employed during the blending and the initial reaction period and may vary from 5 minutes to 6 hours. For most formulations and temperatures of reaction a period of from 15 minutes to 2 hours is satisfactory. The temperature used during the blending and initial reaction step is conveniently between 40° and 90° C. and usually between 45° and 80° C.

Care should be taken in choosing the particular components of the reaction mixture and the reaction conditions, including the temperature, used in the blending and initial reaction step to ensure that the reaction does not proceed at such a rate that the reaction mixture becomes too viscous to be adequately mixed or removed from the blending vessel. The addition of water to the reaction mixture is often beneficial in controlling the viscosity of the mixture. Conditions suitable for blending particular mixtures may be determined by simple small scale experiments.

After blending and initial reaction the reaction mixture is then transferred to a mould and the temperature of the reaction mixture maintained in the range from 45° C. to 110° C. until the evolution of heat from the reaction mixture has substantially ceased and the reaction mixture has become rigid. As the reaction is exothermic the temperature of the reaction mixture may be maintained in the preferred temperature range by use of a suitably insulated mould or by placement of the mould in a suitably insulated container. However, preferably the reaction mixture is maintained in the preferred temperature range by placing the mould in an air circulated oven. When the evolution of heat from the reaction mixture has substantially ceased and the reaction mixture has become rigid the mould is allowed to cool and the reaction mixture released from the mould in the form of a substantially rigid block.

The size and shape of the moulds is not narrowly critical and the feed blocks manufactured by the process of the present invention may be in forms ranging from small cubes or pellets suitable for admixture with other animal feedstuffs to large lick or nibble blocks weighing in excess of 100 lb weight. We have found that for use in the field blocks in the form of a rectangular parallelepiped of approximate dimensions 1'×1'×0.5' and weighing approximately 50 lb are convenient.

The amount of active magnesium oxide used in the manufacture of feed blocks according to the process of the invention will vary widely depending upon the nature and amounts of the other constituents in the feed block and the end use of the block. In the production of high phosphate therapeutic feed blocks amounts of active magnesium oxide as low as 5–10% by weight of the total block ingredients may be used. In the production of feed supplement blocks wherein the water bearing medium is, for example, water, aqueous whey, molasses or sorbitol levels of active magnesium oxide as low as 5–15% by weight of the total block ingredients may be used. However, if high magnesium content blocks are required up to 30% by weight of active magnesium oxide may be used in production of the block. Where therapeutic feed blocks are required containing magnesium in an amount greater than that equivalent to 30% by weight of active magnesium oxide, dead burned or inactive magnesium oxide may be incorporated into the block. In this way blocks may be prepared using from 5 to 40% by weight magnesium oxide comprising 5 to 30% of weight of active magnesium oxide with the balance being inactive or dead burned magnesium oxide. Although the dead burned magnesium oxide may comprise part of the water bearing medium used in step 1 of the process of the present invention it is preferred that the dead burned magnesium oxide be blended into the reaction mixture in step 3 of the process. If required additional sources of magnesium such as, for example, magnesium chloride and magnesium carbonate may be incorporated into the feed blocks made by the process of the present invention.

The amount of dicalcium phosphate used in the manufacture of feed blocks according to the process of the present invention will vary widely depending upon the nature and amounts of the other constituents in the feed block and the end use of the block. In the production of low phosphate feed blocks amounts of dicalcium phosphate as low as 3% by weight of the total block ingredients may be used. However, even in low phosphate blocks preferably 7 to 15% by weight of dicalcium phosphate is used as the inclusion of dicalcium phosphate increases the reaction rate of the mixture and results in a block having better physical properties. Where high phosphate content therapeutic feed blocks are required up to 50% by weight of dicalcium phosphate may be used. As hereinbefore noted, the dicalcium phosphate used in step 2 of the process of the present invention is preferably in finely divided or powdered form. However, depending on the locally available phosphate sources, when high phosphate content therapeutic feed blocks are required it may be preferable to use a small amount of powdered dicalcium phosphate, say 5 to 15% by weight, in step 2 of the process of the invention and to blend in the additional phosphate required in step 3 of the process of the invention. Suitable sources of additional phosphate include calcium phosphate, granular dicalcium phosphate, tricalcium phosphate, bone meal and rock phosphate.

As hereinbefore noted, depending on whether they are to be used as feed supplement and/or therapeutic feed blocks, a variety of animal nutrients and/or animal medicaments may be incorporated into the feed blocks made by the process of the present invention.

The amount of animal nutrient incorporated into feed blocks made according to the process of the present invention may vary widely and will to some extent depend upon both the end use of the block and the nature of the nutrient additive. Mixtures of nutrients may be used if required. Feed supplement blocks containing up to 20% by weight of urea as a non-protein nitrogen source and blocks containing up to 40% of feed meals as a source of protein and/or carbohydrate have been prepared according to the process of the invention.

The amount of animal medicament incorporated into therapeutic feed blocks made according to the process of the present invention will vary widely depending on the medicament used and the condition being treated. As hereinbefore discussed, where required, therapeutic feed blocks containing the equivalent of up to 40% by weight of magnesium oxide may be prepared according to the process of the present invention. Such blocks find application in treating the problem of magnesium deficiency in certain animals and especially ruminant animals such as sheep and cattle. Therapeutic feed blocks containing the equivalent of up to 50% dicalcium phosphate may also be prepared according to the process of the present invention. Such blocks find application in supplementing phosphate deficiencies in ruminant animals and especially cattle. Other ingredients including sources of sodium such as sodium chloride, sources of inorganic sulphur such as sodium sulphate and calcium sulphate, and sources of calcium such as calcium hydroxide, mono-, di- and tri-calcium phosphates and calcium sulphate may also be incorporated in the feed blocks prepared according to the process of the present invention, where it is desired to prepare blocks to supplement the natural intake of these elements.

Trace elements and vitamins may also be incorporated into therapeutic feed blocks prepared according to the process of the present invention where it is desired to prepare blocks to supplement the natural intake of trace elements and vitamins. The amount of such trace elements and vitamins incorporated in a therapeutic feed supplement block may vary widely and will depend on the particular trace element or vitamin used, the degree of the deficiency being treated and the rate of ingestion of the therapeutic feed block.

Other animal medicaments which are suitable for the treatment or prevention of animal diseases and which may be administered orally may also be incorporated in therapeutic animal feed blocks prepared by the process of the present invention. The amount of animal medicament to be incorporated in the therapeutic animal feed block will depend upon the medicament used, the dose rate at which that medicament is normally employed and whether the medicament is being used for the treatment of an animal disease or as a prophylactic measure.

The animal nutrients and animal medicaments which may be incorporated into the feed blocks prepared by the process of the present invention may form or be incorporated into the water bearing medium used in step 1 of the process, but preferably such nutrients and medicaments are blended into the reaction mixture in step 3 of the process. In general it is preferred to add animal medicaments in step 3 of the process of the invention, that is towards the end of the blending operation, in order to minimize the time for which the medicaments are held at a relatively high temperature.

It is also preferred, in general, to add animal nutrients (especially the feed meals) and certain animal medicaments, such as additional sources of magnesium and phosphate, in step 3 of the process of the invention as addition of these ingredients often results in a considerable increase in the viscosity of the reaction mixture. Thus a short blending period after the final addition is often necessary to avoid excessive thickening of the reaction mixture and the resultant difficulty of transfer of the reaction mixture to moulds.

Thus the process of the invention is eminently suitable for the preparation of:

high protein content, rigid, animal feed supplement blocks, for example, blocks prepared from 30 to 70% by weight of molasses, 5 to 15% by weight of magnesium oxide, 3 to 15% by weight of dicalcium phosphate, 0 to 10% by weight of salt, 5 to 40% by weight of feed meal, urea or mixtures thereof, 0 to 10% by weight of water and 0 to 1% by weight of trace elements and vitamins;

high phosphate content, rigid, animal feed supplement blocks, for example, blocks prepared from 30 to 60% by weight of molasses, 5 to 15% by weight of active magnesium oxide 30 to 50% by weight of dicalcium phosphate or from 5 to 15% by weight of dicalcium phosphate supplemented by an additional phosphate source (as hereinbefore defined) equivalent to 25 to 45% by weight of dicalcium phosphate, 0 to 10% by weight of salt, 0 to 10% by weight of urea, 0 to 10% by weight of feed meal, 0 to 10% by weight of water and 0 to 1% by weight of trace elements;

high magnesium content, rigid, animal feed supplement blocks, for example, blocks prepared from 40 to 60% by weight of molasses, 20 to 30% by weight of active magnesium oxide or from 5 to 15% by weight of active magnesium oxide supplemented by an additional magnesium source (as hereinbefore defined) equivalent to 15 to 35% by weight of magnesium oxide, 3 to 20% by weight of dicalcium phosphate, 0 to 10% by weight of salt, 0 to 10% by weight of urea, 0 to 10% by weight of feed meal, 0 to 10% by weight of water and 0 to 1% by weight of trace elements and vitamins; high salt content, rigid, animal feed supplement blocks, for example, blocks prepared from 20 to 40% by weight of molasses, 5 to 15% by weight of active magnesium oxide, 3 to 15% by weight of dicalcium phosphate, 40 to 50% by weight of salt, 0 to 10% by weight of urea, 0 to 10% by weight of feed meal, 0 to 10% by weight of water and 0 to 1% by weight of trace elements and vitamins; and therapeutic, rigid, animal feed supplement blocks containing orally administrable animal medicaments.

The process of the present invention has many advantages over prior art processes for the manufacture of animal food blocks. In our Australian Pat. No. 471,601 we teach a process for the preparation of a grass tetany therapeutic block utilizing a chemical hardening process employing the reaction between magnesium oxide and molasses. In the process of the present invention a chemical hardening process is used employing both magnesium oxide and dicalcium phosphate as hardening agents. In comparison to the process of Australian Pat. No. 471,601 using magnesium oxide alone as a hardening agent the present process utilizing both magnesium oxide and dicalcium phosphate results in an increase in reaction rate thereby decreasing the amount of time which the mixture must be heated in step 2 of the process of the invention, and decreasing the amount of time which the block must be held at a controlled temperature before becoming rigid.

The promotion of block hardening and increase in block hardness obtained by the use of dicalcium phosphate in addition to magnesium oxide as a hardening agent has not only resulted in an improvement in the economics of block production but has also resulted in the process being applicable to the hardening of water bearing media other than molasses. Thus the process of the invention has been applied to the preparation of blocks from water with the inclusion of animal nutrients and/or animal medicaments as required, aqueous whey, aqueous sorbitol and natural fruit juices. Such applications have the advantage of providing a wider possible range of feed blocks and of providing a means for the preparation of animal feed supplement blocks and therapeutic animal feed blocks in areas where molasses is not readily available.

The use of dicalcium phosphate in addition to magnesium oxide as a hardening agent has also allowed the minimum amount of magnesium oxide necessary for block hardening to be reduced. Blocks made using magnesium oxide are alkaline and may be less palatable to certain animals than blocks having a neutral pH. Thus where supplementation of magnesium intake is not required it is often advantageous to keep the amount of magnesium oxide used in block preparation to a minimum to improve block palatability.

Depending upon the end use of the block and thus the required rate of consumption of the block it may be desirable to vary block hardness and palatability. For example, it may be desirable to have a low consumption rate of a therapeutic feed block whereas it is usual to require a high consumption rate of a feed supplement block.

Block hardness may be controlled by varying the block ingredients. In general softer nibble blocks may be prepared by incorporating a high roughage content into the block and reducing the amount of molasses used in the block. Block palatability may also be improved by the inclusion of: humectants such as, for example, suitable surfactants or glycerol in order to soften the block surface; sweetening agents such as, for example, sorbitol, molasses, and other suitable sweetening agents; feed grains which are attractive to animals; and fruit juices.

Suitable organic acids, for example, acetic acid and propionic acid and inorganic acids, for example, sulphuric acid and phosphoric acid may be used to promote block hardening and reduce block alkalinity but the effect of such acids is marginal.

The invention is now illustrated by, but in no way limited to, the following examples in which all parts are expressed as parts by weight unless otherwise stated.

General Process for the Preparation of Animal Feed Blocks According to the Process of the Invention The water bearing medium was charged into a jacketed vessel and heated to a temperature not in excess of 90° C., preferably in the range from 45° C. to 80° C., and agitated with a cavitation mixer or ribbon blender. Heating was then ceased and active magnesium oxide and dicalcium phosphate was added to the vessel and the contents mixed for a sufficient length of time to form a substantially uniform reaction mixture, the temperature of the mixture being maintained below 90° C. Animal medicaments and/or animal nutrients were then blended into the reaction mixture as required together with additional water if required and the mixture transferred to moulds while the viscosity of the mixture was still low enough to allow facile transference. The moulds were immediately transferred to an air circulating oven and the reaction mixture in the mould maintained at a temperature in the range from 45° C. to 110° C. and preferably in the range from 55° C. to 90° C. until the reaction mixture became rigid. The moulds were then removed from the oven stacked and allowed to cool to ambient temperature. The reaction mixture was then released from the moulds in the form of a rigid block.

The general process outlined above was used to prepare feed blocks having the formulations given in the examples listed in the following Tables 1 to 4.

TABLE I

High Magnesium Content Blocks

| Example No | Water Bearing Medium (%) | Active MgO (%) | Dicalcium Phosphate (%) | Additives (%) | | Mix Temperature (°C.) | Oven Time (hr) |
|---|---|---|---|---|---|---|---|
| 1 | Molasses | 54 | 11$^a$ | 10 | "Fifield" Magnesia Flour$^b$ | 12.5 | 65 | c. 2 |
|   |          |    |        |    | Salt | 9 | | |
|   |          |    |        |    | Water | 3 | | |
|   |          |    |        |    | Trace Elements | 0.5 | | |
| 2 | Molasses | 48 | 10$^a$ | 10 | Magnesium Carbonate | 20 | 65 | c. 2 |
|   |          |    |        |    | Salt | 8 | | |
|   |          |    |        |    | Water | 4 | | |
| 3 | Water    | 49 | 30$^a$ | 16 | Acetic Acid | 5 | 70 | c. 1.5 |
| 4 | Molasses | 49 | 5$^c$  | 16 | Dead Burned MgO | 17 | 60 | c. 1 |
|   |          |    |        |    | Salt | 7 | | |
|   |          |    |        |    | Rice Meal | 2 | | |
|   |          |    |        |    | Water | 3.5 | | |
|   |          |    |        |    | Trace Elements | 0.5 | | |
| 5 | Molasses | 49 | 30$^a$ | 7  | Salt | 8 | 65–70 | c. 2 |

TABLE 1-continued

High Magnesium Content Blocks

| Example No | Water Bearing Medium (%) | Active MgO (%) | Dicalcium Phosphate (%) | Additives (%) | | Mix Temperature (°C.) | Oven Time (hr) |
|---|---|---|---|---|---|---|---|
| | | | | Sorbitol | 6 | | |

[a] "Causmag" AL4
[b] A dead burned magnesium oxide
[c] Martin Marietta 469

TABLE 2

High Phosphate Content Blocks

| Example No | Water Bearing Medium (%) | Active MgO (%) | Dicalcium Phosphate (%) | Additive (%) | | Mix Temperature (°C.) | Oven Time (hr) |
|---|---|---|---|---|---|---|---|
| 6 | Molasses 40 | 9[a] | 40 | Salt<br>Water | 5<br>6 | 70 | 1 at 75° C. |
| 7 | Molasses 49 | 7[c] | 35 | Salt<br>Water | 7<br>2 | 70 | 1 at 75° C. |

[a] "Causmag" AL4  [c] Martin Marietta 469

TABLE 3

High Protein Content Blocks

| Example No | Water Bearing Medium (%) | Active MgO (%) | Dicalcium Phosphate (%) | Additives (%) | | Mix Temperature (°C.) | Oven Time (hr) |
|---|---|---|---|---|---|---|---|
| 8 | Molasses 58.45 | 11[c] | 7.5 | Urea<br>Rice Meal<br>Salt<br>Trace Elements and vitamins | 10.8<br>7<br>5<br><br>0.25 | 70 | 2 at 75° C. |
| 9 | Molasses 55.45 | 13[d] | 7.5 | Urea<br>Rice Meal<br>Salt<br>Acetic Acid<br>Trace Elements and vitamins | 10.8<br>7<br>5<br>1<br><br>0.25 | 70 | 2 at 75° C. |
| 10 | Molasses 55.5 | 12[a] | 16 | Urea<br>Salt<br>Acetic Acid | 7<br>8<br>1.5 | 70 | 2 at 75° C. |
| 11 | Molasses 44.25 | 9[c] | 5 | Urea<br>Peanut Meal<br>Salt<br>Water<br>Trace Elements and Vitamins | 6.5<br>25<br>7<br>3<br><br>0.25 | 70 | 2 at 75° C. |
| 12 | Molasses 63.25 | 8.5[c] | 15 | Urea<br>Rice Meal<br>Salt<br>Trace Elements and Vitamins | 6.5<br>4<br>2.5<br><br>0.25 | 70 | 2 at 75° C. |
| 13 | Molasses 59.75 | 11[d] | 15 | Urea<br>Rice Meal<br>Salt<br>Acetic acid<br>Trace Elements and Vitamins | 6.5<br>4<br>2.5<br>1<br><br>0.25 | 70 | 2 at 75° C. |
| 14 | Molasses 42.25 | 10[a] | 5 | Urea<br>Cotton Seed Meal<br>Salt<br>Water<br>Trace Elements and Vitamins | 6.5<br><br>25<br>7<br>4<br><br>0.25 | 70 | 2 at 75° C. |
| 15 | Water 50 | 13[a] | 7 | Meat Meal<br>Wheat Dust<br>Salt<br>Acetic Acid | 15<br>7<br>7<br>1 | 65 | 0.75 |
| 16 | Water 43 | 11[a] | 4 | Urea<br>Cotton Seed Meal<br>Salt<br>Acetic Acid | 10<br>26<br>4.5<br>1.5 | 65 | 1 |
| 17 | Water 40 | 12[a] | 10 | Cotton Seed Meal<br>Salt | 33<br>5 | 70 | 1 |
| 18 | Water 50 | 15[a] | 10 | Meat Meal<br>Wheat Dust<br>Salt<br>Acetic Acid | 11.5<br>6<br>6<br>1.5 | 80 | 1 |

TABLE 3-continued

High Protein Content Blocks

| Example No | Water Bearing Medium (%) | | Active MgO (%) | Dicalcium Phosphate (%) | Additives (%) | | Mix Temperature (°C.) | Oven Time (hr) |
|---|---|---|---|---|---|---|---|---|
| 19 | Water | 40 | 14$^a$ | 15 | Meat Meal | 12 | 70 | 2 |
|  |  |  |  |  | Urea | 6 |  |  |
|  |  |  |  |  | Wheat Dust | 5.5 |  |  |
|  |  |  |  |  | Salt | 6 |  |  |
|  |  |  |  |  | Acetic Acid | 1.5 |  |  |
| 20 | Water | 50 | 11$^a$ | 15 | Meat Meal | 14 | 65 | 2 |
|  |  |  |  |  | Wheat Dust | 4 |  |  |
|  |  |  |  |  | Salt | 5 |  |  |
|  |  |  |  |  | Acetic Acid | 1 |  |  |
| 21 | Water | 40 | 14$^a$ | 6 | Monoammonium Phosphate | 20 | 75 | 3 |
|  |  |  |  |  | Soya Meal | 10 |  |  |
|  |  |  |  |  | Salt | 8 |  |  |
|  |  |  |  |  | Acetic Acid | 2 |  |  |
| 22 | Orange Juice | 50 | 12$^a$ | 14 | Cotton Seed Meal | 19 | 65 | 2 |
|  |  |  |  |  | Pollard | 5 |  |  |
| 23 | Whey$^e$ | 40 | 14$^a$ | 5 | Wheat Dust | 12 | 70 | 2 |
|  | Molasses | 10 |  |  | Tallow | 12 |  |  |
|  |  |  |  |  | Salt | 5 |  |  |
|  |  |  |  |  | Acetic Acid | 2 |  |  |
| 24 | Whey$^e$ | 40 | 14$^a$ | 8 | Cotton Seed Meal | 8 | 70 | 3 |
|  | Molasses | 14 |  |  | Wheat Dust | 5 |  |  |
|  |  |  |  |  | Salt | 10 |  |  |
|  |  |  |  |  | Acetic Acid | 1 |  |  |
| 25 | Whey$^e$ | 30 | 15$^a$ | 14 | Urea | 10 | 65 | 3 |
|  | Molasses | 29.5 |  |  | Acetic Acid | 1.5 |  |  |
| 26 | Whey$^e$ | 47 | 10$^a$ | 3.5 | Meat Meal | 11.5 | 65 | 5 |
|  | Molasses | 19 |  |  | Salt | 7.5 |  |  |
|  |  |  |  |  | Acetic acid | 1.5 |  |  |
| 27 | Whey$^e$ | 50 | 11$^a$ | 3.5 | Cotton Seed Meal | 6 | 65 | 3 |
|  | Molasses | 20 |  |  | Salt | 8 |  |  |
|  |  |  |  |  | Acetic Acid | 1.5 |  |  |
| 28 | Whey$^e$ | 62 | 10$^a$ | 6 | Meat Meal | 12 | 70 | 6 |
|  |  |  |  |  | Salt | 8 |  |  |
|  |  |  |  |  | Acetic Acid | 2 |  |  |
| 29 | Sorbitol$^f$ | 48 | 12$^a$ | 8 | Soya Bean Meal | 30 | 65 | 2 |
|  |  |  |  |  | Salt | 2 |  |  |
| 30 | Sorbitol$^f$ | 45 | 12$^a$ | 5 | Soya Bean Meal | 30 | 65 | 2 |
|  |  |  |  |  | Salt | 3 |  |  |
|  |  |  |  |  | Urea | 5 |  |  |
| 31 | Molasses | 60.5 | 12$^a$ | 8 | Urea | 10 | 70 | 2 |
|  |  |  |  |  | Soya Bean Meal | 3 |  |  |
|  |  |  |  |  | Salt | 5 |  |  |
|  |  |  |  |  | Acetic Acid | 1.5 |  |  |
| 32 | Molasses | 52 | 8$^a$ | 5 | Soya Bean Meal | 30 | 55–70 | 2.5 |
|  |  |  |  |  | Urea | 4 |  |  |
|  |  |  |  |  | Salt | 1 |  |  |
| 33 | Molasses | 34 | 10$^a$ | 5 | Soya Bean Meal | 25 | 55–70 | 2.5 |
|  |  |  |  |  | Urea | 7 |  |  |
|  |  |  |  |  | Salt | 7 |  |  |
|  |  |  |  |  | Water | 12 |  |  |
| 34 | Molasses | 49 | 6$^c$ | 3 | Peanut Meal | 20 | 55–70 | 2.5 |
|  |  |  |  |  | Urea | 9 |  |  |
|  |  |  |  |  | Salt | 8.5 |  |  |
|  |  |  |  |  | Water | 4 |  |  |
|  |  |  |  |  | Trace Elements | 0.5 |  |  |
| 35 | Water | 43 | 11$^a$ | 5 | Cotton Seed Meal | 26 | 55–70 | 2.5 |
|  |  |  |  |  | Urea | 10 |  |  |
|  |  |  |  |  | Salt | 5 |  |  |
| 36 | Molasses | 35 | 11$^a$ | 6 | Millet Seed Meal | 40 | 55–70 | 2.5 |
|  |  |  |  |  | Urea | 4 |  |  |
|  |  |  |  |  | Water | 4 |  |  |

$^a$"Causmag" AL4
$^c$Martin Marietta 469
$^d$Magox 90
$^e$Concentrated whey 41% solids
$^f$70% Aqueous

TABLE 4

| | | | High Salt Content Blocks | | | | |
|---|---|---|---|---|---|---|---|
| Example No | Water Bearing Medium (%) | | Active MgO (%) | Dicalcium Phosphate (%) | Additives (%) | Mix Temperature (°C.) | Oven Time (hr) |
| 37 | Molasses | 32 | 8[c] | 6 | Salt 46<br>Water 8 | 60 | 1.5 |
| 38 | Molasses | 26.5 | 8[c] | 3 | Rice Meal 3<br>Salt 50<br>Water 9<br>Trace Minerals 0.5 | 65 | 2 |

[c]Martin Marietta 469

I claim:

1. A process for the manufacture of a rigid alkaline, animal feed supplement block which process comprises the following steps in sequence:
   (1) heating a water bearing medium chosen from the group consisting of water, aqueous whey, aqueous sorbitol, aqueous glucose, aqueous fructose, aqueous sucrose and molasses to a temperature in the range from 20° C. to 90° C.
   (2) adding to said water bearing medium an amount of active magnesium oxide in the range from 5% to 30% by weight of the total block ingredients and an amount of dicalcium phosphate in the range from 3 to 50% by weight of the total block ingredients and blending the mixture of the water bearing medium, magnesium oxide and dicalcium phosphate at a temperture not in excess of 90° C. for a sufficient length of time to obtain a substantially uniform reaction mixture;
   (3) optionally blending into the mixture additional water or one or more liquid or solid animal medicaments or animal nutrients;
   (4) transferring said reaction mixture to a mould; and
   (5) reacting said mixture in the mould at a temperature in the range from 45° C. to 110° C. to give a substantially rigid alkaline block.

2. A process according to claim 1 wherein said water bearing medium is heated to a temperature above 40° C.

3. A process according to claim 2 wherein the temperature is in the range from 55° to 80° C.

4. A process according to claim 1 wherein the amount of active magnesium oxide added to the water bearing medium is in the range from 5 to 15% by weight of the total block ingredients.

5. A process according to claim 1 wherein the amount of dicalcium phosphate added to the water bearing medium is in the range from 3 to 35% by weight of the total block ingredients.

6. A process according to claim 1 wherein the reaction mixture is blended at a temperature in the range from 45° to 80° C.

7. A process according to claim 1 wherein in step (3) of said process additional water in an amount in the range from 1 to 10% by weight of the total block ingredients is blended into the reaction mixture.

8. A process according to claim 1 wherein in step (3) of said process there is blended into the reaction mixture one or more animal medicaments chosen from the group consisting of vitamins, trace elements, additional sources of magnesium, additional sources of calcium, additional sources of phosphate, sodium chloride, sources of sulfur, medicaments suitable for oral administration to animals to treat animal diseases or to kill or repel animal pests, and mixtures thereof.

9. A process according to claim 8 wherein the animal medicaments are chosen from the group consisting of vitamins, trace elements, dead burned magnesium oxide, magnesium chloride, magnesium carbonate, calcium sulfate, calcium hydroxide, calcium phosphate, dicalcium phosphate, tricalcium phosphate, bone meal, rock phosphate, monoammonium phosphate, sodium chloride, sodium sulfate and mixtures thereof.

10. A process according to claim 9 wherein the animal medicaments are chosen from the group consisting of vitamins, trace elements, dead burned magnesium oxide, magnesium carbonate, sodium chloride, and monoammonium phosphate.

11. A process according to claim 1 wherein in step (3) of said process there is blended into the reaction mixture one or more animal nutrients chosen from the group consisting of tallow, barley meal, blood meal, dried buttermilk, cotton seed meal, linseed meal, meat meal, bone meal, wheat middlings, soya bean meal, dried whey, peanut meal, rice meal, sunflower meal, maize germ, roughage, crushed grain, millet seed, molasses cane, glucose, sucrose, fructose, sorbitol, wheat dust, urea, biuret, methylene, diurea, urea phosphate, urea sulfate, crotonylidene diurea and isobutylidene diurea.

12. A process according to claim 11 wherein the animal nutrient is chosen from rice meal, sorbitol, urea, peanut meal, cotton seed meal, meat meal, wheat dust, soya meal, tallow, and millet seed meal.

13. A process according to claim 1 wherein the reaction mixture is blended for a period of from 5 minutes to 6 hours.

14. A process according to claim 13 wherein the period is from 15 minutes to 2 hours.

15. A process according to claim 1 wherein the reaction mixture in said mould is maintained in the said temperature range by the use of an insulated mould or by the placement of said mould in an insulated container.

16. A process according to claim 1 wherein the reaction mixture in said mould is maintained in the said temperature range by placing the mould in an air circulated oven.

17. A process according to claim 1 for the preparation of a high protein content rigid animal feed supplement block comprising from 30 to 70% by weight of molasses, 5 to 15% by weight of magnesium oxide, 3 to 15% by weight of dicalcium phosphate, 0 to 10% by weight of salt, 5 to 40% by weight of feed meal, urea or mixtures thereof, 0 to 10% by weight of water and 0 to 1% by weight of trace elements and vitamins.

18. A process according to claim 1 for the preparation of a high phosphate content rigid animal feed supplement block comprising from 30 to 60% by weight of molasses, 5 to 15% by weight of active magnesium oxide, 30 to 50% by weight of dicalcium phosphate or from 5 to 15% by weight of dicalcium phosphate supplemented by an additional phosphate source chosen from the group consisting of calcium phosphate, dicalcium phosphate, tricalcium phosphate, bone meal, rock phosphate and monoammonium phosphate and equivalent to 25 to 45% by weight of dicalcium phosphate, 0 to 10% by weight of salt, 0 to 10% by weight of urea, 0 to 10% by weight of feed meal, 0 to 10% by weight of water and 0 to 1% by weight of trace elements and vitamins.

19. A process according to claim 1 for the preparation of a high magnesium content rigid animal feed supplement block comprising from 40 to 60% by weight of molasses, 20 to 30% by weight of active magnesium oxide or from 5 to 15% by weight of active magnesium oxide supplemented by an additional magnesium source chosen from the group consisting of dead burned magnesium oxide, magnesium chloride and magnesium carbonate and equivalent to 15 to 35% by weight of magnesium oxide, 3 to 20% by weight of dicalcium phosphate, 0 to 10% by weight of salt, 0 to 10% by weight of urea, 0 to 10% by weight of feed meal, 0 to 10% by weight of water and 0 to 1% by weight of trace elements and vitamins.

20. A process according to claim 1 for the preparation of a high sodium chloride content rigid animal feed supplement block comprising from 20 to 40% by weight of molasses, 5 to 15% by weight of active magnesium oxide, 3 to 15% by weight of dicalcium phosphate, 40 to 50% by weight of salt, 0 to 10% by weight of urea, 0 to 10% by weight of feed meal, 0 to 10% by weight of water and 0 to 1% by weight of trace elements and vitamins.

21. A rigid animal feed supplement block prepared according to the process of claim 1.

22. A high protein content rigid animal feed supplement block prepared according to the process of claim 17.

23. A high phosphate content rigid animal feed supplement block prepared according to the process of claim 18.

24. A high magnesium content rigid animal feed supplement block prepared according to the process of claim 19.

25. A high sodium chloride content rigid animal feed supplement block prepared according to the process of claim 20.

* * * * *